(12) United States Patent
Ebisawa et al.

(10) Patent No.: US 9,972,819 B2
(45) Date of Patent: May 15, 2018

(54) CONNECTOR FOR BATTERY UNIT, AND BATTERY UNIT PROVIDED WITH SAME

(71) Applicant: Japan Aviation Electronics Industry, Limited, Tokyo (JP)

(72) Inventors: Takeshi Ebisawa, Tokyo (JP); Katsuhiko Nakazawa, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 202 days.

(21) Appl. No.: 14/364,912

(22) PCT Filed: Dec. 11, 2012

(86) PCT No.: PCT/JP2012/082037
§ 371 (c)(1),
(2) Date: Jun. 12, 2014

(87) PCT Pub. No.: WO2013/103073
PCT Pub. Date: Jul. 11, 2013

(65) Prior Publication Data
US 2014/0342213 A1 Nov. 20, 2014

(30) Foreign Application Priority Data
Jan. 4, 2012 (JP) .................. 2012-000118

(51) Int. Cl.
*H01M 2/20* (2006.01)
*H01R 27/02* (2006.01)
(Continued)

(52) U.S. Cl.
CPC ........... *H01M 2/20* (2013.01); *H01M 2/1077* (2013.01); *H01M 2/206* (2013.01);
(Continued)

(58) Field of Classification Search
CPC ...................................................... H01M 2/20
See application file for complete search history.

(56) References Cited

U.S. PATENT DOCUMENTS 4,923,416 A * 5/1990 Zinn .................... H01R 13/052
439/877
5,362,261 A 11/1994 Puerner
(Continued)

FOREIGN PATENT DOCUMENTS

CN 101917028 A 12/2010
CN 202190089 U 4/2012
(Continued)

OTHER PUBLICATIONS

International Search Report of PCTJP2012/082037, dated Feb. 12, 2013.
(Continued)

*Primary Examiner* — Wojciech Haske
(74) *Attorney, Agent, or Firm* — Collard & Roe, P.C.

(57) ABSTRACT

To provide a connector for a battery unit in which power supply monitoring is achieved with a simple configuration without requiring a large workload, and a battery unit provided with the same.
A connector 110 for a battery unit 100 has a housing 120, a pair of contacts 130 one of which is connected to a positive electrode of a battery 192 and the other of which is connected to a negative electrode of the battery 192, and a signal connector 140 connected to a control circuit 193 for the battery 192. The pair of contacts 130 and the signal connector 140 are mounted to the housing 120.

4 Claims, 8 Drawing Sheets

(51) Int. Cl.
*H01R 9/24* (2006.01)
*H01M 2/10* (2006.01)
*H01M 10/42* (2006.01)
*H01M 10/48* (2006.01)

(52) U.S. Cl.
CPC ....... *H01M 10/425* (2013.01); *H01M 10/482* (2013.01); *H01R 9/2408* (2013.01); *H01R 27/02* (2013.01)

(56) References Cited

U.S. PATENT DOCUMENTS

| | | | | |
|---|---|---|---|---|
| 5,782,646 | A * | 7/1998 | Broadfield | H01R 27/00 439/346 |
| 5,807,140 | A * | 9/1998 | Hopkins | H01R 31/005 361/679.4 |
| 6,752,654 | B1 * | 6/2004 | Huang | H01R 24/60 439/108 |
| 7,132,833 | B2 | 11/2006 | Layden et al. | |
| 9,059,527 | B2 | 6/2015 | Higuchi et al. | |
| 2002/0043959 | A1 | 4/2002 | Tanaka et al. | |
| 2002/0136042 | A1 * | 9/2002 | Layden | H01M 2/1077 363/146 |
| 2002/0137398 | A1 * | 9/2002 | Miwa | H01R 9/2491 439/701 |
| 2006/0019542 | A1 * | 1/2006 | Wu | H01R 25/00 439/638 |
| 2010/0285677 | A1 * | 11/2010 | Sekino | H01R 27/02 439/83 |
| 2012/0115359 | A1 * | 5/2012 | Ko | H01R 27/02 439/578 |
| 2012/0190235 | A1 * | 7/2012 | Sakurai | H01R 43/24 439/540.1 |
| 2013/0288543 | A1 | 10/2013 | Higuchi et al. | |

FOREIGN PATENT DOCUMENTS

| | | |
|---|---|---|
| EP | 0 701 303 A2 | 3/1996 |
| EP | 2 416 407 A1 | 2/2012 |
| JP | 2002-117821 A | 4/2002 |
| JP | 2002-124225 A | 4/2002 |
| JP | 2003-346940 A | 12/2003 |
| JP | 2005-302611 A | 10/2005 |
| JP | 2006-66352 A | 3/2006 |
| JP | 2006-294338 A | 10/2006 |
| JP | 2010-165579 A | 7/2010 |
| JP | 2012-38531 A | 2/2012 |
| JP | 2012-134063 A | 7/2012 |
| WO | 01/73914 A2 | 10/2001 |
| WO | 2012/086267 A1 | 6/2012 |

OTHER PUBLICATIONS

Chinese Office Action in CN 201280061911.4, dated Oct. 9, 2015, with English translation of relevant parts.
Extended European Search Report dated Jun. 17, 2015 in EP 12864083.6-1360.

* cited by examiner

CONNECTOR FOR BATTERY UNIT, AND BATTERY UNIT PROVIDED WITH SAME

CROSS REFERENCE TO RELATED APPLICATIONS

This application is the National Stage of PCT/JP2012/082037 filed on Dec. 11, 2012, which claims priority under 35 U.S.C. § 119 of Japanese Application No. 2012-000118 filed on Jan. 4, 2012, the disclosure of which is incorporated by reference. The international application under PCT article 21(2) was not published in English.

TECHNICAL FIELD

This invention relates to a connector for a battery unit, and a battery unit provided with the same.

BACKGROUND ART

Heretofore, a relay terminal block 200 for a power supply is known which has a plug-in connector (male) 220 connected to a feeding cable 210, and a plug-in connector (female) 240 connected to the other feeding cable 230 and in which the plug-in connectors 220 and 240 are fitted to each other to thereby connect the feeding cables 210 and 230, as shown in FIG. 14 (see, for example, Patent Document 1).

The plug-in connector (male) 220 is mounted to a plug-in module (not shown) while the plug-in connector (female) 240 is mounted to a receiving structure (not shown) for receiving the plug-in module (not shown).

PRIOR ART DOCUMENT

Patent Document

Patent Document 1: JP-A-2003-346940

SUMMARY OF THE INVENTION

Problem to be Solved by the Invention

Herein, in a power supply system, monitoring of a power supply state may be required. In this case, a signal cable for monitoring a power supply is used.

However, in the system like the conventional relay terminal block 200 for a power supply, which is constructed of a plurality of modules (the plug-in module, the receiving structure) separated from one another, it is sometimes required to provide a signal cable between those modules. In this case, there is a problem that providing the signal cable may result in a complicated system structure and an excessive workload required for a signal-wire mounting operation and the like.

The present invention has therefore been made to solve the conventional problem. Specifically, it is an object of the present invention to provide a connector for a battery unit, in which power supply monitoring is achieved with a simple configuration without requiring a large workload, and a battery unit provided with the same.

Means to Solve the Problem

A connector for a battery unit according to the present invention comprises a housing, a pair of contacts one of which is connected to a positive electrode of a battery and the other of which is connected to a negative electrode of the battery, and a signal connector connected to a control circuit for the battery, the pair of contacts and the signal connector being mounted to the housing, whereby solves the above-mentioned problem.

A plurality of the signal connectors may be provided.

The signal connector may removably be mounted to the housing.

The housing may have a covering portion partly covering the contacts, the covering portion having a plurality of slit portions, a part of the contact, which is not covered with the covering portion, functioning as a contacting portion of the contact.

The contact may have a contacting portion adapted to be brought into contact with a connecting object and a connecting portion adapted to be connected to the battery.

The signal connector may be disposed outside the pair of contacts in a direction in which the pair of contacts are arranged.

The contact may integrally have a contacting portion adapted to be brought into contact with a connecting object and a connecting portion extending to the outside of the housing to be connected to the battery.

A battery unit according to the present invention comprises the connector, a battery, and a casing with the battery contained therein, the connector being mounted to an external surface of the casing and connected to the battery, whereby solves the above-mentioned problem.

Effect of the Invention

According to the present invention, it is possible to achieve power supply monitoring with a simple configuration without requiring a large workload.

MODE FOR EMBODYING THE INVENTION

Figure 1:
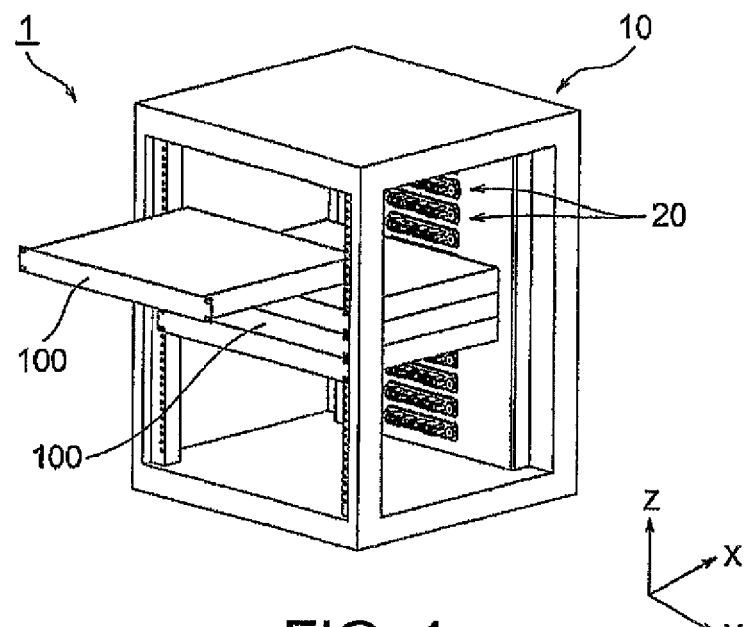
FIG. 1 is a perspective view showing an electric storage device as one embodiment of the present invention, as seen from a front side.

Hereinbelow, description will be made about an embodiment of an electric storage device of the present invention and a plurality of modifications with reference to the drawing.

In the following description, a direction in which a battery unit is inserted into a receiving rack is defined as a first direction X. A direction perpendicular to the first direction X is defined as a second direction Y. A direction perpendicular to the first direction X and the second direction Y is defined as a third direction Z.

Embodiment

Hereinbelow, an electric storage device 1 as one embodiment of the present invention will be described with reference to the drawing.

Figure 2:
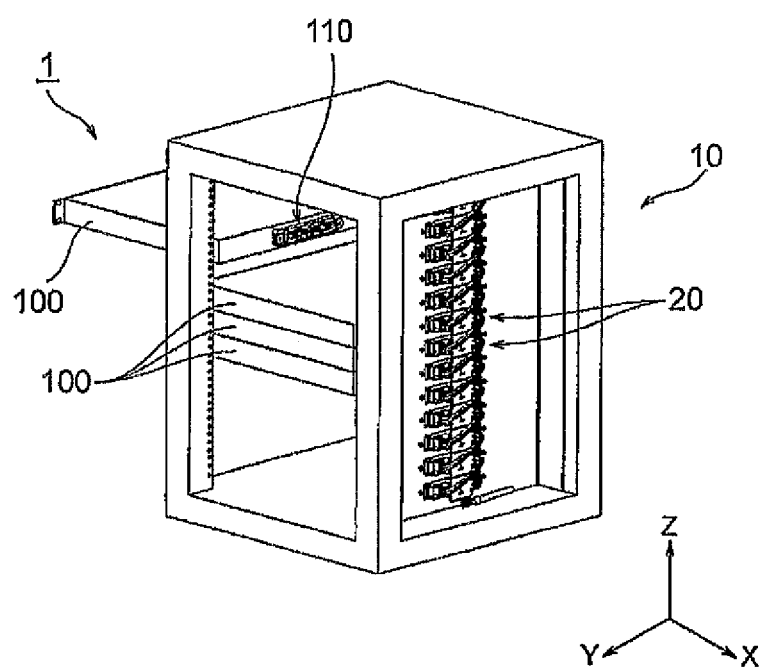
FIG. 2 is a perspective view showing the electric storage device as seen from a rear side.

The electric storage device 1 has a receiving rack 10 and a plurality of battery units 100 inserted into the receiving rack 10, as shown in FIGS. 1 and 2.

Figure 3:
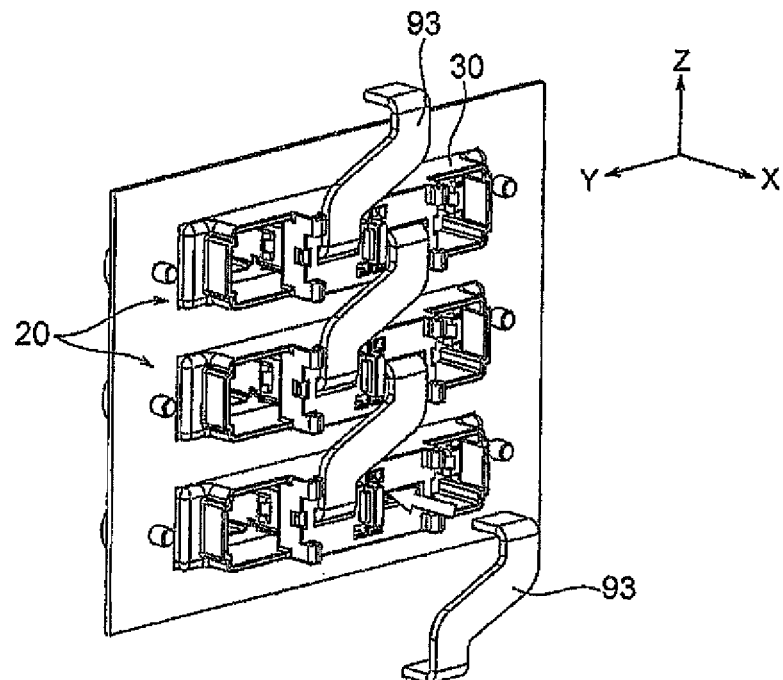
FIG. 3 is a perspective view showing a state where rack-side connecting members are mounted to rack-side connectors.
Figure 4:
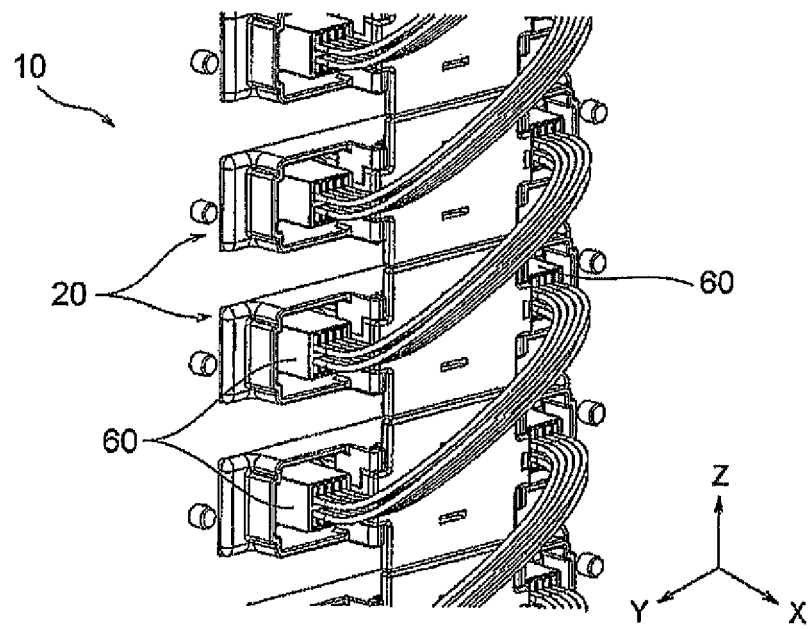
FIG. 4 is a perspective view showing a state where the rack-side connectors are mounted to a receiving rack.

As shown in FIGS. 1 and 2, the receiving rack 10 is mounted with a plurality of rack-side connectors 20 which are connected to one another through rack-side connecting members (bus bars) 93 shown in FIG. 3. Further, as shown in FIG. 2, each of the battery units 100 is mounted with a battery-side connector 110 which is connected to a battery 192 through battery-side connecting members (cables with crimp terminals) 160 shown in FIG. 5.

With the above-mentioned structure, in the electric storage device 1, when the battery units 100 are inserted into the receiving rack 10 as shown in FIGS. 1 and 2, the rack-side connectors 20 are fitted to the battery-side connectors 110, respectively, so that the battery units 100 each of which contains the battery 192 are connected to one another.

A structure of the battery unit 100 in the present embodiment will be described hereinbelow.

Figure 5:
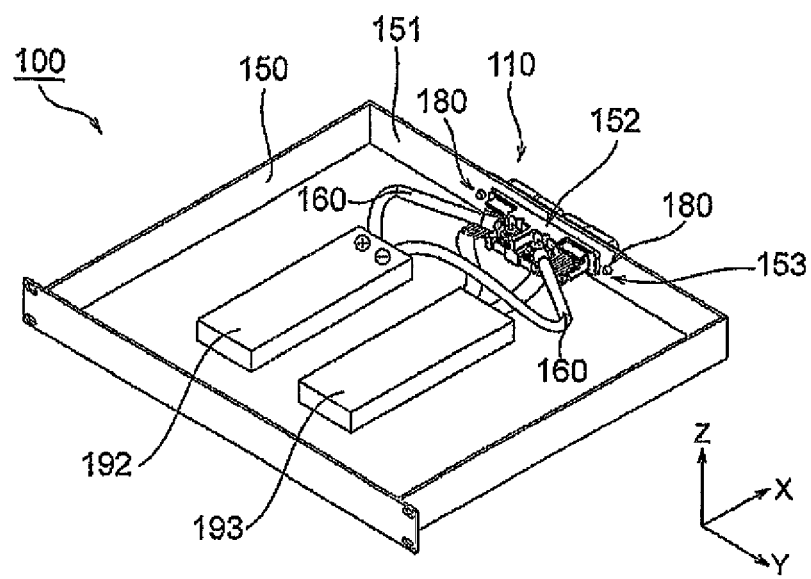
FIG. 5 is a perspective view showing a state where a battery-side connector is mounted to a battery unit.
Figure 6:
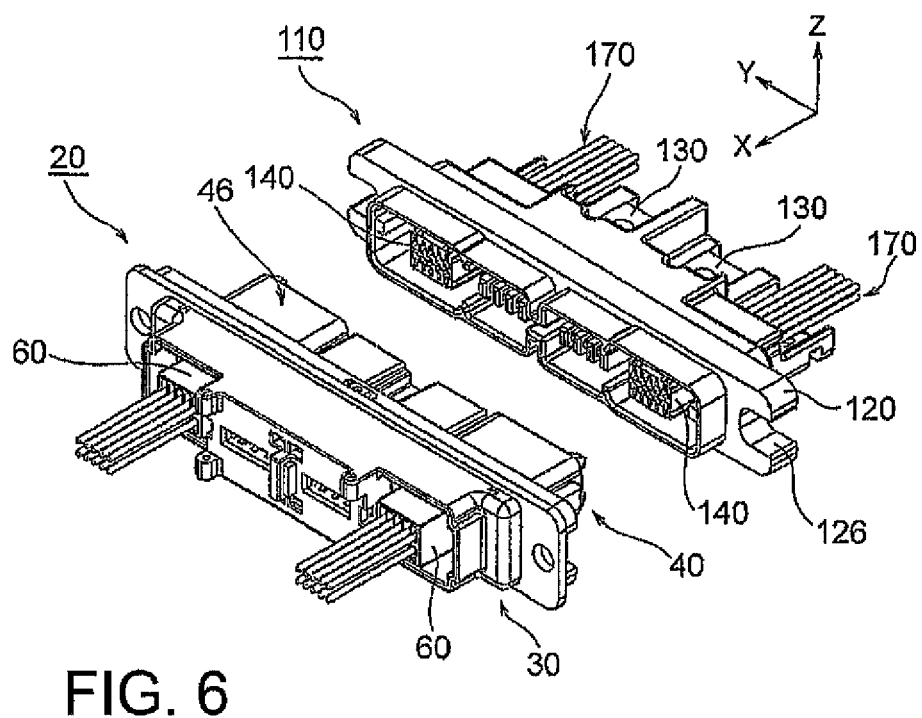
FIG. 6 is a perspective view showing a state where the rack-side connector and the battery-side connector are faced to each other.
Figure 7:
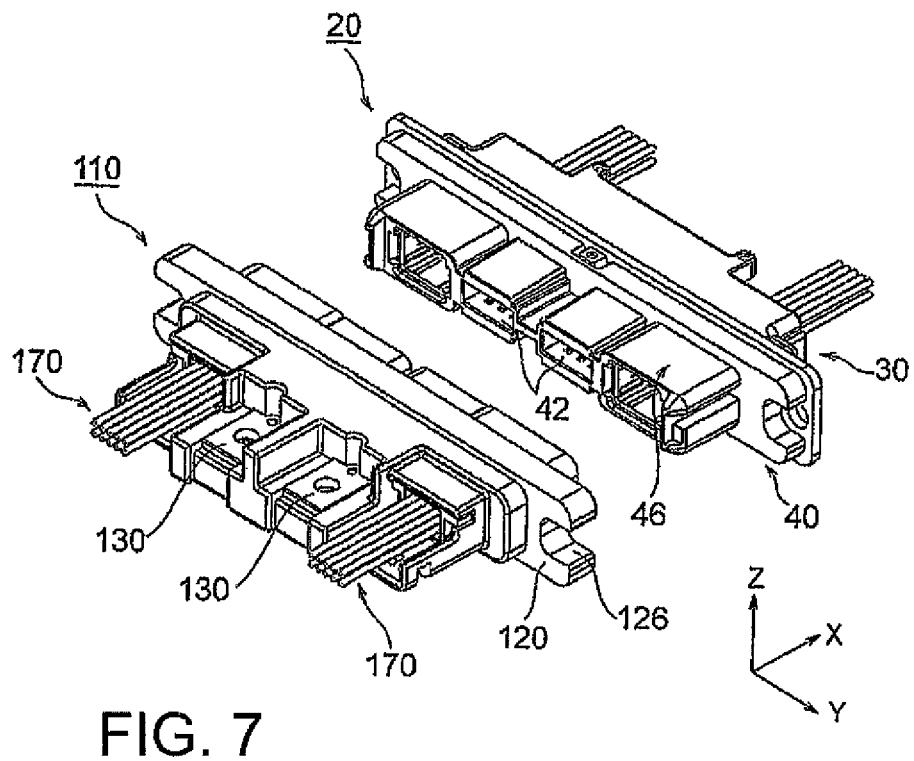
FIG. 7 is a perspective view showing a state where the rack-side connector and the battery-side connector are faced to each other, as seen from a direction different from that in FIG. 6.
Figure 8:
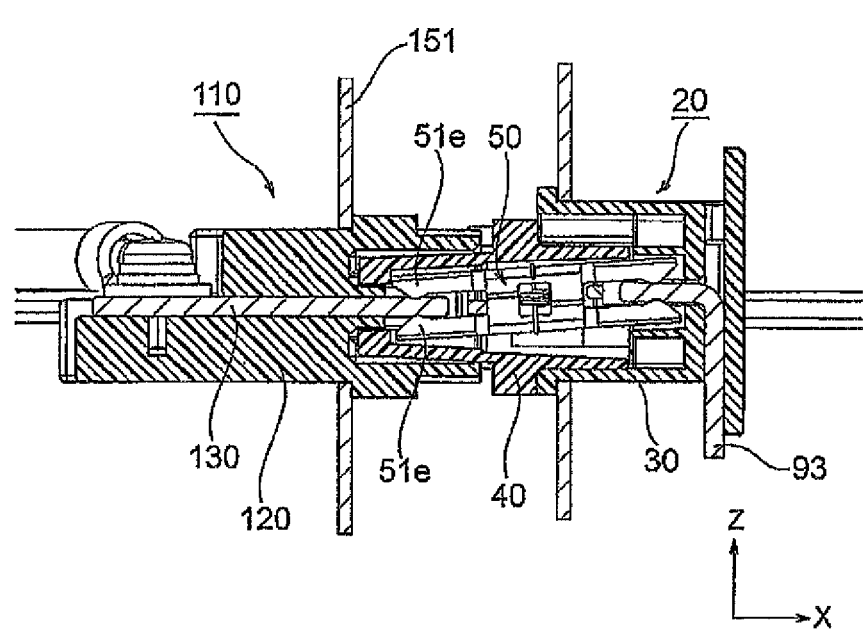
FIG. 8 is a view for describing a state where the rack-side connector and the battery-side connector are fitted to each other, as partly seen in section.

As shown in FIGS. 5 and 6, the battery unit 100 has the battery (secondary battery) 192, the battery-side connector 110 mounted to a battery-side mounting panel 151 of a casing 150, battery-side signal connectors 140 removably mounted to the battery-side connector 110, the casing 150 with the battery 192 contained therein, the battery-side connecting members 160 connecting battery-side contacts 130 of the battery-side connector 110 to the battery 192, battery-side signal cables 170 connected to the battery-side signal connectors 140, battery-side mounting members 180 for mounting the battery-side connector 110 to the casing 150, nuts 190 fitted into a battery-side housing 120, and battery-side locking members 191 for mounting the battery-side contacts 130 to the battery-side housing 120 of the battery-side connector 110.

The battery-side connector 110 is fitted to and connected to the rack-side connector 20 mounted to the receiving rack 10 when the battery unit 100 is inserted into the receiving rack 10, as shown in FIGS. 1 and 2.

Figure 9:
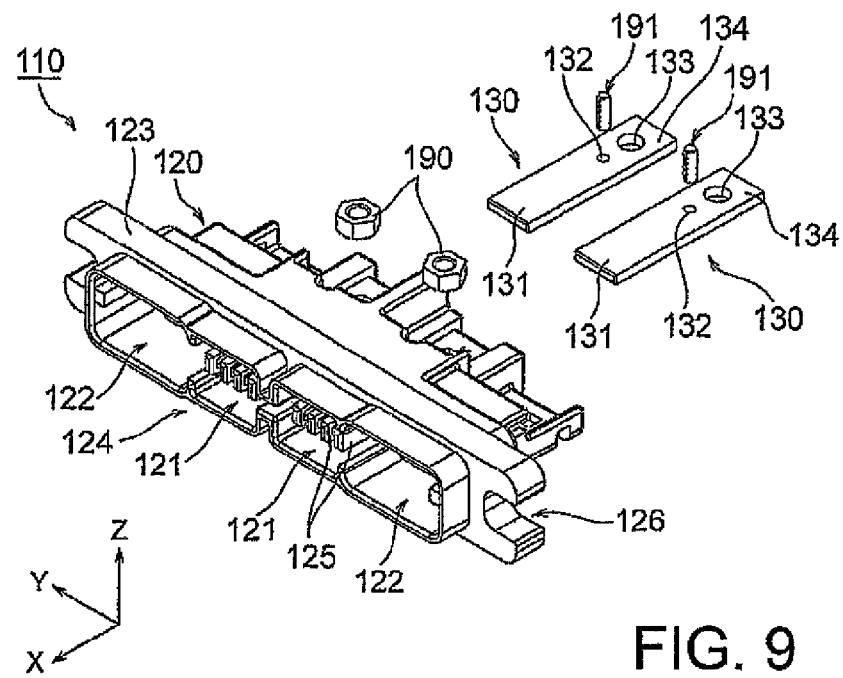
FIG. 9 is an exploded perspective view showing the battery-side connector.
Figure 10:
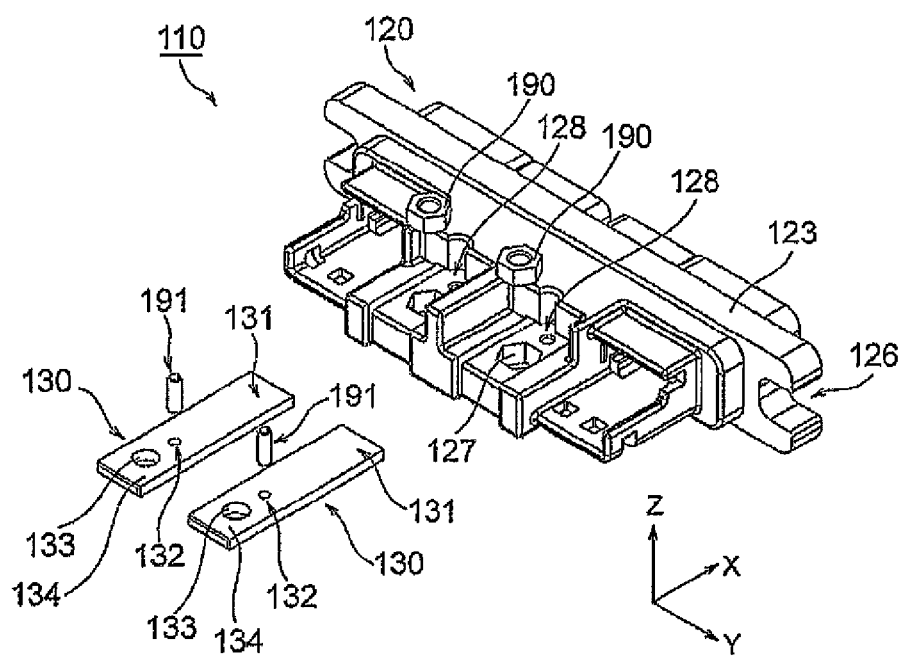
FIG. 10 is an exploded perspective view showing the battery-side connector as seen from a direction different from that in FIG. 9.

The battery-side connector 110 has the battery-side housing 120 to be fixed to the casing 150 and the battery-side contacts 130 held by the battery-side housing 120, as shown in FIGS. 9 and 10.

The battery-side housing 120 is formed of an insulating resin. The battery-side housing 120 is fitted into a mounting opening portion 152 formed at the battery-side mounting panel 151 of the casing 150 as shown in FIG. 5, and fixed to the battery-side mounting panel 151 of the casing 150 by the battery-side mounting members 180 in a state where parts of the battery-side housing are projected inside and outside the casing 150.

As shown in FIGS. 9 to 12, the battery-side housing 120 integrally has battery-side contact receiving portions 121 receiving the battery-side contacts 130, battery-side signal connector receiving portions 122 receiving the battery-side signal connectors 140, a flange portion 123 formed to protrude in the second direction Y and the third direction Z, a fitting opening portion 124 allowing a front-side fitting portion 46 formed on a second housing 40 of the rack-side connector 20 to be inserted therein when the rack-side connector 20 and the battery-side connector 110 are fitted to each other, covering portions 125 each of which partly covers the vicinity of a contacting portion 131 of the battery-side contact 130, mounting-member-receiving concave portions 126 allowing the battery-side mounting members 180 to be inserted therein, nut holding portions 127 holding the nuts 190, and locking-member-receiving hole portions 128 allowing the battery-side locking members 191 to be inserted therein.

Each of the battery-side contact receiving portions 121 is a portion allowing the battery-side contact 130 to be inserted therein in the first direction X and holding the same, as shown in FIG. 9. The battery-side contact receiving portions 121, two in number, are formed. The two battery-side contact receiving portions 121 are arranged adjacent in the second direction Y in a state where they are separated from each other by an intermediate wall. In each of the battery-side contact receiving portions 121, one battery-side contact 130 is received.

Each of the battery-side signal connector receiving portions 122 is a portion for receiving the battery-side signal connector 140. The battery-side signal connector receiving portions 122, two in number, are formed as shown in FIG. 9. The two battery-side signal connector receiving portions 122 are formed at opposite outsides of the two battery-side contact receiving portions 121, respectively, in the second direction Y.

The flange portion 123 is formed to protrude from the battery-side housing 120 in the second direction Y and the third direction Z, as shown in FIGS. 9 and 10. In a state where the battery-side connector 110 is mounted to the casing 150, the flange portion 123 faces the battery-side mounting panel 151 of the casing 150 in the first direction X.

Figure 11:
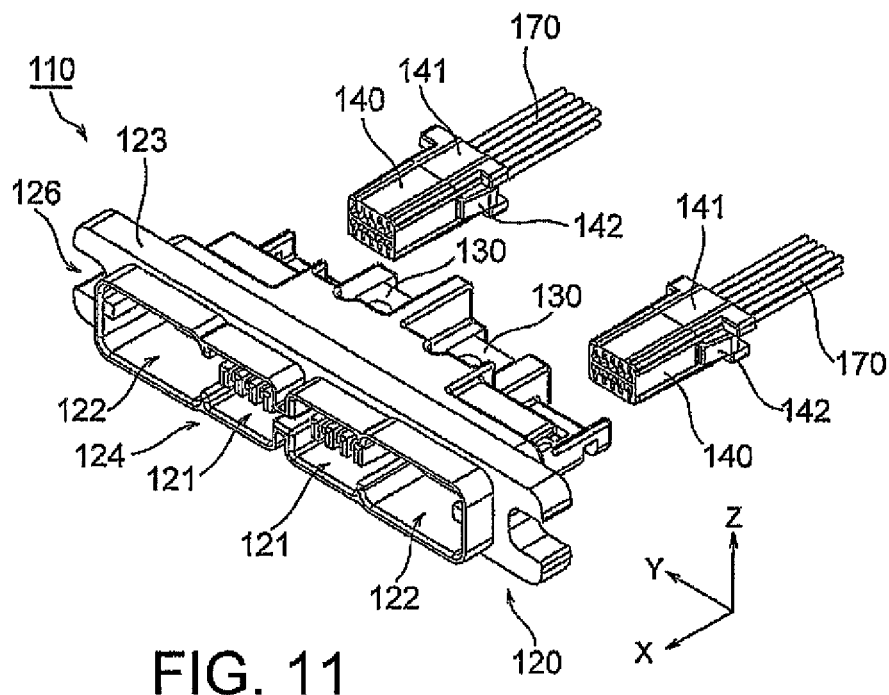
FIG. 11 is a perspective view showing the battery-side connector with battery-side signal connectors removed therefrom.

As shown in FIGS. 9 and 11, the fitting opening portion 124 is an opening portion formed in the first direction X of the battery-side housing 120 allowing the front-side fitting portion 46, which is formed in the second housing 40 of the rack-side connector 20, to be inserted therein when the rack-side connector 20 and the battery-side connector 110 are fitted to each other.

Figure 12:
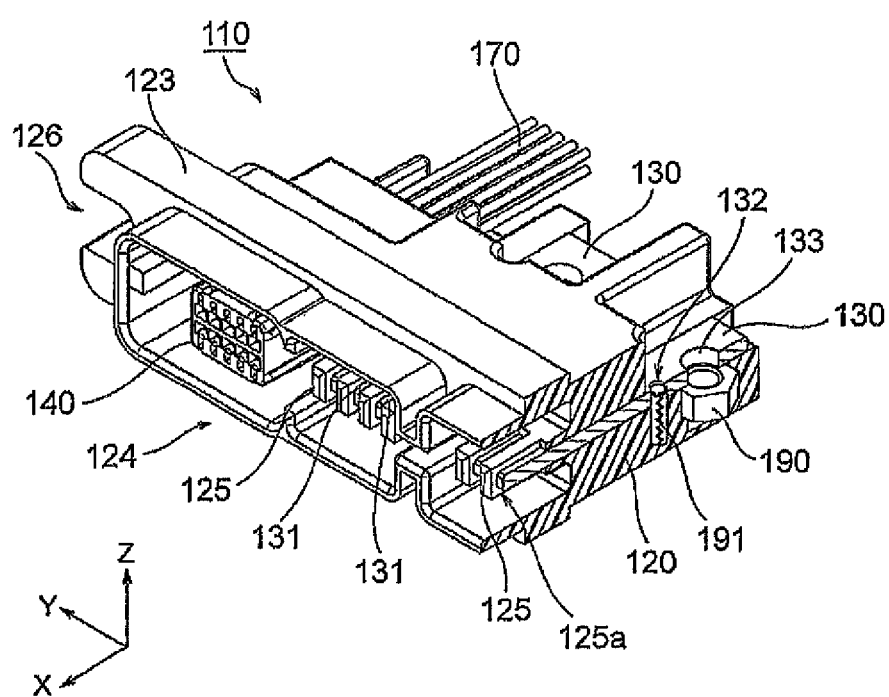
FIG. 12 is a view for describing the battery-side connector as partly seen in section.

Each of the covering portions 125 is a portion partly covering the vicinity of the contacting portion 131 of the battery-side contact 130, as shown in FIG. 12. The covering portion 125 is formed in a comb-like shape, and specifically, has a plurality of slit portions 125a formed at predetermined intervals in the second direction Y. The battery-side connector 110 is brought into contact with rack-side contacts 50 at a portion which is not covered with the covering portion 125, specifically, a portion corresponding to the slit portions 125a and exposed to the outside.

As described above, the vicinity of the contacting portion 131 of the battery-side contact 130 is covered with the covering portion 125. Thus, even in a case where the fitting opening portion 124 has a size set as large as to allow a finger of a user to be inserted inside the fitting opening portion 124, it is possible to prevent the user from directly touching the battery-side contact 130 to be given an electric shock.

Further, in the present embodiment, the second housing 40 of the rack-side connector 20 is movable relative to a first housing 30 in the second direction Y. Also, a second control portion (not shown) formed at the second housing 40 controls a positional relationship in the second direction Y between second insertion opening portions 42 formed in the second housing 40 and second contacting portions 51e of the rack-side contacts 50. As a consequence, a position of the contacting portion 131 on each of the battery-side contacts 130, which is brought into contact with the second contacting portion 51e, is restricted. Therefore, it is possible to cover a position of the battery-side contact 130, which is not brought into contact with the second contacting portion 51e, with the covering portion 125.

In the present embodiment, the covering portion 125 is constructed as a part of the battery-side housing 120. However, separately from the battery-side housing 120, the covering portion 125 may be formed of an insulating material.

The mounting-member-receiving concave portions 126 are formed at the flange portion 123 on opposite ends of the battery-side housing 120, respectively, in the second direction Y, as shown in FIGS. 9 and 10.

Each of the nut holding portions 127 is a portion holding the nut 190 in a state where the nut 190 is prevented from rotation, as shown in FIG. 10.

Each of the locking-member-receiving hole portions 128 is a hole allowing the battery-side locking member 191 to be inserted therein in the third direction Z, as shown in FIG. 10.

Each of the battery-side contacts 130 is a power-supply pin contact formed in a flat plate shape, as shown in FIGS. 9 and 10. The battery-side contact 130 is arranged with respect to the battery-side housing 120 in a state where a long side of a cross section thereof (YZ cross section) is oriented in the second direction Y. The battery-side contacts 130, two in number, are arranged for one battery-side housing 120 and held by the battery-side housing 120, as shown in FIGS. 9 and 10. In the pair of battery-side contacts 130, one battery-side contact 130 has a connecting portion 134 which is connected to a positive electrode of the battery 192 through the battery-side connecting member 160, while the other battery-side contact 130 has a connecting portion 134 which is connected to a negative electrode of the battery 192 through the battery-side connecting member 160.

As shown in FIGS. 9 and 10, each of the battery-side contacts 130 has the contacting portion 131 to be brought into contact with the second contacting portion 51e of the rack-side contact 50 when the battery unit 100 is inserted into the receiving rack 10, a locking-member-receiving hole portion 132 allowing the battery-side locking member 191 to be inserted therein in the third direction Z, and a connecting-member-receiving hole portion 133 formed to connect the battery-side connecting member 160 shown in FIG. 5 to the battery-side contact 130.

In the present embodiment, the portion of the battery-side contact 130, which is not covered with the covering portion 125, specifically, the portion corresponding to the slit portions 125a and exposed to the outside functions as the contacting portion 131.

Figure 13:
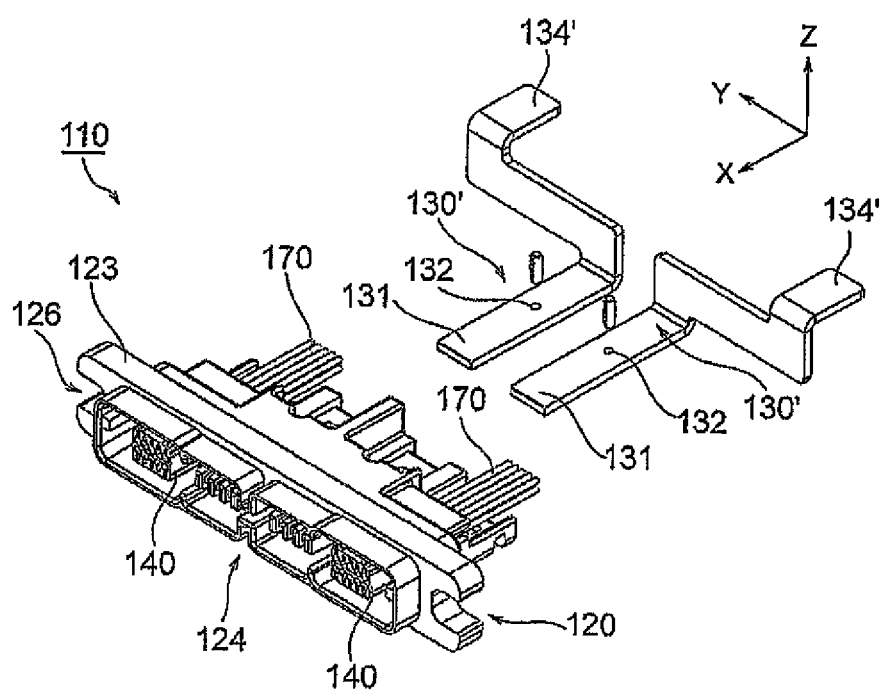
FIG. 13 is a perspective view showing a modification of battery-side contacts of the battery-side connector.
Figure 14:
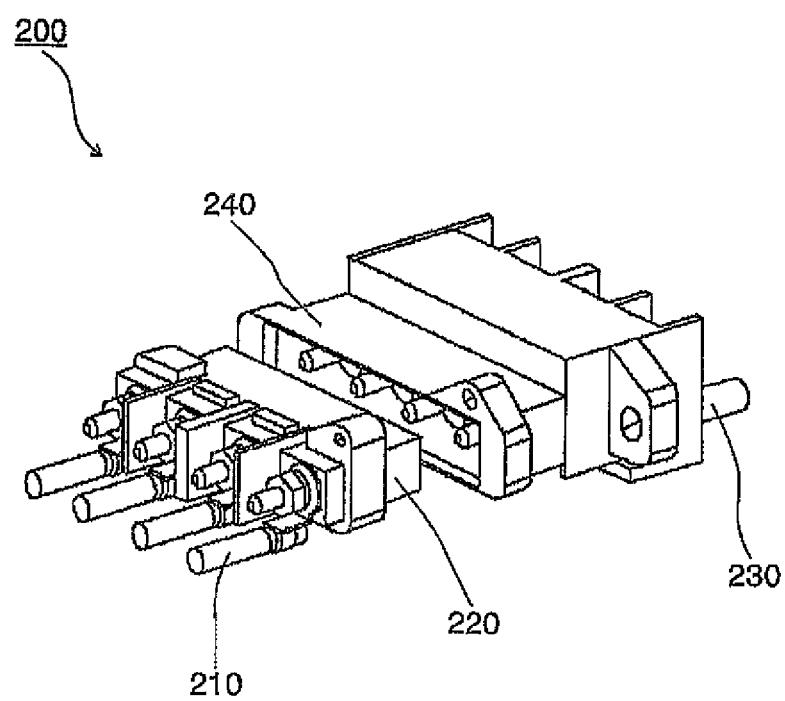
FIG. 14 is a view for describing a conventional relay terminal block for a power supply.

It is noted here that a specific embodiment of the battery-side contact 130 is not limited to that described above. For example, as shown in FIG. 13, a member comprising the battery-side contact 130 having the contacting portion 131 and a bus-bar portion adapted to be connected to the battery 192 and integrally formed therewith may be used as a battery-side contact 130'. In this case, the battery-side contact 130' has the contacting portion 131 and a connecting portion 134' extending to the outside of the battery-side housing 120 to be directly connected to the battery 192. The above-mentioned battery-side contact 130' as a modification does not require the nut 190 and the nut holding portion 127, the battery-side connecting member 160, and the like. Therefore, the number of components can be reduced and a mounting operation between the battery-side contact 130 and the battery-side connecting member 160 is not necessary.

The battery-side signal connectors 140 are removably mounted to the battery-side housing 120 of the battery-side connector 110 and, when the battery unit 100 is inserted into the receiving rack 10, fitted to rack-side signal connectors 60 mounted to the rack-side connector 20, respectively, to transmit a control signal for power supply monitoring and the like. Each of the battery-side signal connectors 140 has a battery-side signal housing 141 removably mounted to the battery-side housing 120, as shown in FIG. 11, and a battery-side signal contact (not shown) held by the battery-side signal housing 141. In the present embodiment, the battery-side signal connector 140 is inserted into the battery-side signal connector receiving portion 122 of the battery-side housing 120 in the first direction X and prevented by spring portions 142 formed at the battery-side signal housing 141 from being released from the battery-side housing 120 in a direction opposite to the first direction X. The battery-side signal contact (not shown) is connected to the battery-side signal cable 170. In the present embodiment, the battery-side signal connectors 140, two in number, are mounted to one battery-side connector 110. However, the number of the battery-side signal connectors 140 may be any desired number. In the present embodiment, the battery-side signal connectors 140 transmit different signals, respectively. In the present embodiment, the battery-side signal connector 140 is removably mounted to the battery-side housing 120. However, the battery-side signal connector 140 may be fixed to the battery-side housing 120. In this case, without providing the battery-side signal housing 141, the battery-side signal contact (not shown) may be directly mounted to the battery-side housing 120.

In this embodiment, in order to reduce the influence on the signals flowing in the battery-side signal connectors 140 due to a magnetic field caused by the current flowing in the battery-side contacts 130, the battery-side signal connectors 140 are disposed on both outer sides, in the second direction Y, of the two battery-side contacts 130 as shown in FIG. 11. That is, since the influence on the signals due to the magnetic field caused by the current flowing in the two battery-side contacts 130 is the strongest between the two battery-side contacts 130 and the weakest on both outer sides of the two battery-side contacts 130, the battery-side signal connectors 140 are disposed on the outer sides of the two battery-side contacts 130 in this embodiment.

The casing 150 receives the respective components of the battery unit 100, such as the battery 192. As shown in FIG. 5, the casing 150 has the battery-side mounting panel (mounting object) 151 to which the battery-side connector 110 is mounted, the mounting opening portion 152 formed at the battery-side mounting panel 151 and allowing the battery-side connector 110 to be fitted thereto, and mounting-member-receiving hole portions 153 formed at the battery-side mounting panel 151 and allowing the battery-side mounting members 180 to be inserted therein.

Each of the battery-side connecting members 160 connects the battery-side contact 130 of the battery-side connector 110 to the battery 192, as shown in FIG. 5. In the present embodiment, the battery-side connecting member 160 is constructed as a cable with a crimp terminal and is connected to the battery-side contact 130 by using the nut 190. A specific embodiment of the battery-side connecting member 160 is not restricted to the cable with a crimp terminal.

Each of the battery-side signal cables 170 is connected to the battery-side signal contact (not shown) of the battery-side signal connector 140 and to a control circuit 193 for the battery 192.

The battery-side mounting members 180 serve to fix the battery-side connector 110 to the casing 150, as shown in FIG. 5. In the present embodiment, the battery-side mounting members 180 are constructed as bolts as a specific embodiment. However, any component may be used as long as it is adapted to fix the battery-side connector 110 to the casing 150.

As shown in FIGS. 9, 10, and 12, each of the nuts 190 is fitted in the battery-side housing 120 and used to mount the battery-side connecting member 160 to the battery-side signal connector 140.

As shown in FIGS. 9, 10, and 12, each of the battery-side locking members 191 is inserted into the locking-member-receiving hole portion 132 formed at the battery-side contact 130 and into the locking-member-receiving hole portion 128 formed at the battery-side housing 120 to fix the battery-side contact 130 to the battery-side housing 120 of the battery-side connector 110. In the present embodiment, the battery-side locking member 191 is constructed as a spring pin which is reduced in diameter by applying a force from its outer circumference and is increased in diameter by releasing the force. However, a specific embodiment thereof is not restricted to that described above.

In the present embodiment thus obtained, in addition to the battery-side contacts 130 as power supply contacts, the battery-side signal connectors 140 are mounted to the battery-side connector 110. Therefore, when the battery unit 100 is inserted into the receiving rack 10, in addition to the connection between the rack-side contacts 50 and the battery-side contacts 130 as the power supply contacts, the rack-side signal connectors 60 and the battery-side signal connectors 140 for the control signal of the battery 192 are connected to each other. Thus, it is possible to achieve the power supply monitoring with a simple configuration without requiring a large workload.

In the foregoing embodiment, description has been made assuming that the battery-side housing of the battery-side connector is fixed to the mounting object (battery-side mounting panel). However, the battery-side housing may be movably mounted to the mounting object (battery-side mounting panel).

DESCRIPTION OF REFERENCE NUMERALS 1 electric storage device
10 receiving rack
20 rack-side connector
30 first housing
40 second housing
42 second insertion opening portion
46 front-side fitting portion
50 rack-side contact (connecting object)
51e second contacting portion
60 rack-side signal connector
93 rack-side connecting member (bus bar)
100 battery unit
110 battery-side connector (connector)
120 battery-side housing (housing)
121 battery-side contact receiving portion
122 battery-side signal connector receiving portion
123 flange portion
124 fitting opening portion
125 covering portion
125a slit portion
126 mounting-member-receiving concave portion
127 nut holding portion
128 locking-member-receiving hole portion
130, 130' battery-side contact (contact)
131 contacting portion
132 locking-member-receiving hole portion
133 connecting-member-receiving hole portion
134, 134' connecting portion
140 battery-side signal connector (signal connector)
141 battery-side signal housing
142 spring portion
150 casing
151 mounting object (battery-side mounting panel)
152 mounting opening portion
153 mounting-member-receiving hole portion
160 battery-side connecting member (cable with crimp terminal)
170 battery-side signal cable
180 battery-side mounting member
190 nut
191 battery-side locking member
192 battery
193 control circuit
X first direction
Y second direction
Z third direction

The invention claimed is:

1. A connector for a battery unit which includes a battery and a control circuit for the battery, the battery having a positive electrode and a negative electrode, the connector comprising:

a housing having a pair of contact receiving portions and a pair of connector receiving portions, Wherein the contact receiving portions are aligned adjacent to one another on a straight line, the connector receiving portions being aligned on the straight line and arranged adjacent to both outer sides, respectively, of the pair of the contact receiving portions, a pair of contacts one of which is connected to the positive electrode and the other of which is connected to the negative electrode, and a pair of signal connectors connected to the control circuit, wherein:

the contacts are mounted to the contact receiving portions, respectively, the signal connectors are mounted to the connector receiving portions, respectively, each of the signal connectors being removable from each of the connector receiving portions, the housing has a pair of insulating covering portions which are arranged in the contact receiving portions and partly cover the contacts, respectively, each of the insulating covering portions has a plurality of slit portions, and a part of each of the contacts is exposed to each of the contact receiving portions through each of the slit portions to function as a contacting portion for contacting to a counterpart connector.

2. The connector according to claim 1, wherein each of the contacts comprises:

a contacting portion adapted to be brought into contact with a connecting object, and a connecting portion adapted to be connected to the battery.

3. The connector according to claim 1, wherein each of the contacts comprises:

a contacting portion adapted to be brought into contact with a connecting object, and a connecting portion coupled to the contacting portion and extending to the outside of the housing to be connected to the battery.

4. A battery unit comprising:

the connector according to claim 1, a battery, and a casing with the battery contained therein, wherein the connector is mounted to an external surface of the casing and connected to the battery.

\* \* \* \* \*